United States Patent
Wu et al.

(10) Patent No.: US 12,438,432 B2
(45) Date of Patent: Oct. 7, 2025

(54) LOW TEMPERATURE MAGNETOHYDRODYNAMICS POWER SYSTEM

(71) Applicant: Her Majesty The Queen In Right of Canada as Represented by the Minister of Natural Resources, Ottawa (CA)

(72) Inventors: Lijun Wu, Kanata (CA); Philip Geddis, Ottawa (CA); Steven Chen, Nepean (CA); Andrew McDonald, Ottawa (CA); Alex McCready, Sittsville (CA); Bruce Clements, Nepean (CA)

(73) Assignee: HER MAJESTY THE QUEEN IN RIGHT OF CANADA AS REPRESENTED BY THE MINISTER OF NATURAL RESOURCES, Ottawa (CA)

( * ) Notice: Subject to any disclaimer, the term of this patent is extended or adjusted under 35 U.S.C. 154(b) by 0 days.

(21) Appl. No.: 18/550,151

(22) PCT Filed: Mar. 11, 2022

(86) PCT No.: PCT/CA2022/050366
§ 371 (c)(1),
(2) Date: Sep. 12, 2023

(87) PCT Pub. No.: WO2022/187971
PCT Pub. Date: Sep. 15, 2022

(65) Prior Publication Data
US 2024/0171055 A1  May 23, 2024

Related U.S. Application Data

(60) Provisional application No. 63/160,257, filed on Mar. 12, 2021.

(51) Int. Cl.
  *H02K 44/08* (2006.01)
  *F01K 21/00* (2006.01)
  (Continued)

(52) U.S. Cl.
  CPC .......... *H02K 44/08* (2013.01); *F01K 21/005* (2013.01); *F01K 25/06* (2013.01); *F01K 25/065* (2013.01);
  (Continued)

(58) Field of Classification Search
  CPC ............................... H02K 44/08–28
  See application file for complete search history.

(56) References Cited

U.S. PATENT DOCUMENTS 3,158,764 A * 11/1964 Webb ............... H02K 44/085
                                                    310/11
3,443,129 A * 5/1969 Hammitt ........... H02K 44/085
                                                    310/11
(Continued)

FOREIGN PATENT DOCUMENTS

CN   112240233 A  *  1/2021  ............ F01D 15/10
CN   113644806 A  *  11/2021
(Continued)

OTHER PUBLICATIONS

ISR and WO received in PCT/CA2022/050366 on Jun. 15, 2022.

*Primary Examiner* — Laert Dounis
(74) *Attorney, Agent, or Firm* — Daniel C. Pierron; Widerman Malek, PL

(57) ABSTRACT

The present invention discloses a magnetohydrodynamics power system which utilizes low temperature heat source. Variable control of the operation of the system, along with determining configurations for specific cases, are made possible by selecting the refrigerant, liquid metal circuit geometry, and by adjusting the system condensing pressure (Continued)

and/or temperature. Adjustable condensing pressure and/or temperature allows the system to react to changing ambient temperature and maximize power output. Adjusting condensing pressure and/or temperature of the system is made possible with a variable condenser pressure controller. The variable condenser pressure controller allows utilization of the physical properties of the refrigerant over a wide range of condensing temperatures/pressures, including pressures in the vacuum range. Meanwhile rare earth permanent magnets in paired Halbach arrays are used in the magnetohydrodynamics generator to augment the magnetic field, and a series electrode connection is made possible to achieve a high voltage output.

14 Claims, 9 Drawing Sheets

(51) Int. Cl.
    *F01K 25/06* (2006.01)
    *F01K 27/00* (2006.01)
    *F03G 4/00* (2006.01)

(52) U.S. Cl.
    CPC ............ *F01K 27/00* (2013.01); *F03G 4/001* (2021.08); *F03G 4/037* (2021.08); *H02K 44/085* (2013.01)

(56) References Cited

U.S. PATENT DOCUMENTS

| | | | | |
|---|---|---|---|---|
| 3,636,389 | A | * | 1/1972 | Petrick ................. H02K 44/085 310/11 |
| 4,191,901 | A | * | 3/1980 | Branover ................. F03G 6/00 310/11 |
| 4,388,542 | A | * | 6/1983 | Lovelace ................ F24S 20/20 310/11 |
| 5,637,934 | A | * | 6/1997 | Fabris .................... H02K 44/10 310/11 |
| 2013/0000304 | A1 | * | 1/2013 | Tsuboi .................... F01K 9/023 60/692 |
| 2020/0366180 | A1 | * | 11/2020 | Mills ................... H01L 31/0735 |

FOREIGN PATENT DOCUMENTS

DE        3218303 A1 * 11/1983
WO    WO-2022153047 A1 *  7/2022    ........... B01D 5/0003

* cited by examiner

LOW TEMPERATURE MAGNETOHYDRODYNAMICS POWER SYSTEM

CROSS-REFERENCE TO RELATED APPLICATION

The present non-provisional patent application claims the benefit of and priority to U.S. Provisional Patent Application No. 63/160,257, filed Mar. 12, 2021.

FIELD OF THE INVENTION

The present invention relates to energy efficient and environmentally friendly magnetohydrodynamics power systems which utilize low temperature heat sources.

BACKGROUND OF THE INVENTION

Low-temperature heat sources, which usually refer to the heat sources with temperature below 150° C., are abundantly available.

Untapped low-temperature heat sources can be found in many sources, for example:
(1) Geothermal sources: As an example, in Canada, most attainable geothermal resources have temperatures of less than 150° C., and are mainly located in British Columbia, Northwest Territories, Yukon, and Alberta. With the exception of a new Organic Rankine Cycle binary power cycle project near Estevan Saskatchewan, which final commissioning for the first facility is expected in 2021, the geothermal resources at this temperature and below have only been used for heating with heat pumps where people reside. However, in Northern Canada, population centres are small and sometimes remote where large thermal fields are normally not within an economically reachable distance. Electricity is easier to transport than heat, but the thermal efficiency of geothermally-derived electricity is quite low, for example, at around 6% due to the low temperature of geothermal heat, according to Geological Survey of Canada (see Grasby, S. E., Allen, D. M., Bell, S., Chen, Z., Ferguson, G., Jessop, A., Kelman, M., Ko, M., Majorowicz, J., Moore, M., Raymond, J., Therrien, R. 2012, Geothermal Energy Resource Potential of Canada, Geological Survey of Canada Open File 6914.) Accordingly, over 90% or more of the extracted geothermal energy is lost, leading to the need for efficiency and economics improvement.
(2) Solar heat: Passive solar panels, such as vacuum tube types, can reach temperature as high as 200° C. Since 50-70% of the energy used in the Canadian housing and building sector is for space heating, solar thermal is supposed to be the best solution for clean heating. However, due to an unbalanced heating load between heating and non-heating seasons, a system sized for meeting the requirements for heating season load will generate too much unwanted heat in the non-heating season, resulting in requiring additional equipment to dissipate the unwanted heat. As a result, solar heating has not been successfully applied.
(3) Industrial processes: In Canada, 46,200 TJ of energy goes to waste from sources between 5° and 150° C., and 52,700 TJ are available for those between 15° and 230° C.
(4) Fossil-fuel based power production: According to the data provided by Statistics Canada in 2014, conventional steam and combustion turbine systems account for 15.9% and 4.5% of total power generated annually respectively.

The amount of low-grade heat produced from these sources is estimated to be about 148,400 TJ annually (mainly from exhaust systems).

When employing existing technologies, however, most of the low-temperature heat sources are not recovered or used for power generation, due to the low conversion efficiencies and high capital requirements.

Currently, low-grade heat-to-power technologies are focused on heat stream temperatures above 230° C., because this temperature range represents the most economically viable market for technologies such as the Organic Rankine Cycles and the Kalina cycles that are now commercially available.

Commercial applications exist for both the Organic Rankine Cycles and the Kalina Cycles for heat sources below 150° C., but such applications have found limited use because of poor benefits versus costs analysis, especially in Canada. For example, the Total Installed Cost per kW of the Organic Rankine Cycle binary power cycle project near Estevan, Saskatchewan is approximately $8000 TIC/KW without contingency or overhead.

Other technologies including liquid metal magnetohydrodynamics, thermoelectric devices, and metal hydride looping are still at their early stages of commercialization.

Standard Organic Rankine Cycle systems that are based on the Rankine cycle principles and include turbomachinery are usually limited by the vapor condensing temperature in summer conditions.

A typical configuration of an Organic Rankine Cycle system is shown in FIG. 1. A working fluid changes from liquid to vapor in an evaporator by a heat source, expands to produce work in an expander, releases the remaining heat in a regenerator, then changes from vapor back to liquid by a heat sink, and finally be pressurized with a pump and pre-heated in a regenerator for the next cycle.

Because a fixed vapor condensing temperature is usually set to match the high end of the summer temperature of a local climate (heat sink), the capability of the Organic Rankine Cycle system to use low temperature heat sources that are available all year-round is rather limited due to its low conversion efficiency. For example, for an Organic Rankine Cycle system operating between 100° C. and 30° C., the temperature difference of 70° C. might have little potential for power generation.

Such a cycle is illustrated in FIG. 2, referred to as Rankine cycle 1S-2S-3S-4S-5RS-6S-1S. It is a typical Organic Rankine Cycle system that can convert heat to work using a heat source at a temperature greater than 100° C. and a heat sink at a summer temperature lower than 30° C. Its efficiency is lower than and limited by a Carnot cycle efficiency of 18.76% between 100° C. and 30° C. With Genetron™ 245fa (R-245fa) as the working fluid, for example, the ideal Organic Rankine Cycle efficiency is 15.87%. Considering other losses, the actual efficiency is even lower. Data from studies show that the cycle net efficiency is only half of its ideal Organic Rankine Cycle efficiency.

Therefore, there exists the need to improve the efficiencies of such systems.

Liquid metal magnetohydrodynamics technology emerged in the 1980s and 1990s was mainly developed by Professor Herman Branover at Ben Gurion University, Israel, (see, for example, U.S. Pat. Nos. 4,191,901, 4,381,463 and 4,828,610), and also see "Testing of a low-temperature liquid-metal MHD power system" by Branover, H., A. El-Boher, and A. Yakhot. Energy Conversion and Management, 22:163-169, 1981.

Subsequent studies were carried out by Satyamurthy et al. (see "Basic Design of a Prototype Liquid Metal Magnetohydrodynamic Power Generator for Solar and Waste Heat" by Satyamurthy, P., N. Venkatramani, A. M. Quraishi, and A. Mushtaq, Energy Conversion and Management, 40:913-935, 1999).

The liquid metal magnetohydrodynamics technology is based on Ericsson cycle and has higher ideal cycle efficiency than that of the Organic Rankine Cycle.

As shown in FIG. 2, between 100° C. and 30° C., an Ericsson cycle 1S-2S-3S-4S-5ES-6S-1S possesses a larger area than that of a Rankine cycle 1S-2S-3S-4S-5RS-6S-1S, suggesting that the Ericsson cycle can produce more work than the Rankine cycle. With Genetron™ 245fa (R-245fa) as a working fluid, for example, the ideal Ericsson cycle efficiency is 17.65% higher than the ideal Organic Rankine Cycle efficiency of 15.87%.

To date, however, the liquid metal magnetohydrodynamics technology has not been successfully commercialized.

Illustrated in FIG. 3 is a vertical configuration of the liquid metal magnetohydrodynamics system proposed by Professor Herman Branover and further studied by Satyamurthy et al. The cycle is represented as Ericsson cycle 1S-2S-3S-4S-5ES-6S-1S in FIG. 2.

In FIG. 3, the liquid metal magnetohydrodynamics system consists of a mixer, a riser, a separator, a heat exchanger, a condenser, a pump, a downcomer, and a magnetohydrodynamics generator (magnetohydrodynamics channel and magnets). Depending upon the heat source, heat energy is added either to the thermodynamic fluid, liquid metal, or to both. The thermodynamic fluid (either in a vapor or liquid form) enters the mixer at an appropriate pressure. The thermodynamic fluid is fully converted to a vapor (in the case where it enters as liquid) in the mixer. A two-phase flow is created in the riser due to the density difference between the fluids within the riser and downcomer. This circulates the liquid metal in the loop and creates a pressure head. The vapor expands in the riser and is separated from the liquid metal in the separator. The separated vapor enters into a heat exchanger and then a condenser. The liquid metal alone flows through the downcomer, magnetohydrodynamics generator (where electrical power is obtained) and back to the mixer, thus completing the loop.

Some of the requirements of the liquid metal magnetohydrodynamics technology, such as the use of superconducting niobium alloy magnets (electromagnets), were of particular interest as 'warm' superconductors were discovered during that period. However, for liquid metal magnetohydrodynamics technology, as for all renewable energy technologies, energy balance (i.e., how to get more energy out of a system than it has been put in the system) remains a challenge.

In existing liquid metal magnetohydrodynamics systems, there were several chemical engineering technical challenges such as friction, barrier layers, and thermal insulation.

The challenge that prevents a scale-up of liquid metal magnetohydrodynamics technology was that each increase in diameter of the pipes resulted in an increase of losses, as the gas bubbles would tend to coalesce and slip past the lead rather than 'lifting' it.

There were also other issues. For example, although lithium and sodium/potassium alloys would reduce the density differential compared to wood's metal, the disadvantages of higher cost, corrosion potential, and the explosion risks associated with lithium and sodium/potassium weighed against the implementation of such systems. In any event, lithium and sodium/potassium alloys have high melting temperatures (180.55° C. for lithium, 97.85° C. for sodium, 63.2° C. for potassium) and are not suitable for low temperature applications.

Mercury, another liquid metal studied most within the liquid metal magnetohydrodynamics systems in the past, has good properties for low temperature applications, however, its main drawback is it toxicity. Evidence of the attempted commercialization of the Branover design exists, however, the commercializing entities soon failed.

Another drawback in existing liquid metal magnetohydrodynamics systems is that the refrigerants used were Freon™ based, for example, Genetron™ 113, which causes ozone layer depletion.

Since the time of this initial failure, there have been several developments that would increase the chance of success of this technology.

With the advancement in materials and design tools in recent years, there has been more interest in liquid metal magnetohydrodynamics for low temperature application than in the past.

New liquid metal, refrigerant, permanent magnet, two-phase flow study with computational fluid dynamics, etc. are available for advancing liquid metal magnetohydrodynamics technology, especially for low temperature applications.

Therefore, there remains a need for magnetohydrodynamics power systems which utilize low temperature heat sources and are energy efficient, and environment friendly.

SUMMARY OF THE INVENTION

The present invention discloses magnetohydrodynamics power systems which utilize low temperature heat sources and are energy efficient, and environment friendly.

The present disclosure describes a method and system to capture more heat from a low temperature heat source than that is currently possible.

According to the present invention, variable control of the operation of the low temperature magnetohydrodynamics system as disclosed herein, along with determining configurations for specific cases, are made possible by selecting the refrigerant, liquid metal loop geometry, and by adjusting the system condensing pressure and/or temperature.

According to one aspect of the invention, adjusting pressure and/or temperature of the low temperature magnetohydrodynamics system is made possible with a variable condenser pressure controller.

The low temperature magnetohydrodynamics system can react to changing ambient conditions and provide stable power output from the generator by adjusting the heat captured by the refrigerant. The variable condenser pressure controller allows utilization of the physical properties of the refrigerant over a wide range of pressures (including pressures in the vacuum range). Doing so maximizes the heat transfer to the low temperature magnetohydrodynamics system and therefore improves power output.

According to another aspect of the invention, in the low temperature magnetohydrodynamics systems, a permanent magnet generator is used, and a novel magnetic field design based on the paired Halbach array is implemented to augment the magnetic field, and a series electrode connection is made possible to achieve a high voltage output.

According to a further aspect of the invention, the vertical position of the low temperature magnetohydrodynamics system allows the condenser to be installed at a high elevation and thus reduce the power loss of the system.

According to another aspect of the invention, in the low temperature magnetohydrodynamics system as disclosed herein, an integrated separator and recuperator design can eliminate pipe heat losses in between the two devices.

According to another aspect of the invention, in the low temperature magnetohydrodynamics system as disclosed herein, an integrated mixer and recuperator design makes the system design more compact.

According to another aspect of the invention, in the low temperature magnetohydrodynamics system as disclosed herein, a two-phased magnetohydrodynamics generator on riser design is used, in order to accommodate design requirements for specific situations.

According to one aspect of the invention, there is provided a system for converting a low-temperature heat source into power, comprising:
a vertically positioned closed-looped liquid metal circuit for containing and circulating a liquid metal,
a vertically positioned closed-looped refrigerant circuit for containing and circulating a refrigerant,
the liquid metal circuit and the refrigerant circuit interacting with each other through a mixer, a riser and a separator shared by the liquid metal circuit and the refrigerant circuit,
a closed-looped heat sink circuit interacting with the refrigerant circuit through a condenser shared by the heat sink circuit and the refrigerant circuit,
a closed-looped heat source circuit interacting with the liquid metal circuit through a heat exchanger shared by the heat source circuit and the liquid metal circuit, and
a pressure controller,
wherein:
the low-temperature heat source transfers heat to the liquid metal circulating the liquid metal circuit through the heat exchanger to provide a heated liquid metal,
the heated liquid metal enters the mixer and heats the refrigerant circulating the refrigerant circuit into vapor form, the liquid metal and the refrigerant in vapor form producing a two-phase mixture,
the two-phase mixture flows up the riser and into the separator to be separated,
wherein:
the refrigerant in vapor form, after being separated from the liquid metal in the separator, enters through:
a recuperator, wherein the refrigerant in vapor form releases heat to liquid refrigerant,
the condenser, wherein the refrigerant is further cooled down by passing through a coolant from a heat sink to release heat to the heat sink and the refrigerant in vapor form changes into liquid refrigerant,
a liquid pump, the liquid pump drives flow of the liquid refrigerant,
the recuperator, wherein the liquid refrigerant is preheated by the refrigerant in vapor form, and
the mixer wherein the liquid refrigerant upon mixing with the heated liquid metal entering the mixer changes from liquid refrigerant into the refrigerant in vapor form, and
wherein:
the liquid metal, after being separated from the refrigerant in the separator, enters through:
a magnetohydrodynamic generator through a downcomer, the magnetohydrodynamic generator converts kinetic energy of the liquid metal into electricity,
the heat exchanger, wherein the low-temperature heat source transfers the heat to the liquid metal circulating the liquid metal circuit to provide the heated liquid metal, and wherein the pressure controller controls speed of the liquid pump and flowrate of the liquid refrigerant according to an adjustable pressure in the condenser following the changing temperature of the heat sink to vary condensing temperature in the condenser.

According to one embodiment of the invention, the low-temperature heat source is heat source with temperature below 150° C. Temperature higher than 150° C. makes the invention more efficient.

According to one embodiment of the invention, ambient air or ambient water is used as the heat sink.

According to one embodiment of the invention, temperature of the heat sink is between −50° C. and 50° C.

According to one embodiment of the invention, the temperature of the heat sink is between −35° C. and 25° C.

According to one embodiment of the invention, the liquid metal is an alloy comprising gallium, indium, and tin.

According to one embodiment of the invention, the liquid metal is Galinstan™.

According to one embodiment of the invention, the refrigerant is at least one of hydrocarbon refrigerants.

According to one embodiment of the invention, the system further comprises a gas-lift pump at the location of mixer when the thermodynamic fluid is a vapor or gas to improve circulation of the liquid metal, wherein gas injection position is configured in the riser in central/axial, annular/axial, or annular/radial mode.

According to one embodiment of the invention, rare earth permanent magnets in paired Halbach arrays are used in the magnetohydrodynamics generator to augment the magnetic field, and a series electrode connection is made possible to achieve a high voltage output.

According to one embodiment of the invention, the condenser is installed at an elevation sufficient to compensate the inlet pressure of the pump thereby eliminating the use of the pump.

According to one embodiment of the invention, the recuperator and the separator are integrated.

According to one embodiment of the invention, the recuperator and the mixer are integrated.

According to one embodiment of the invention, an additional magnetohydrodynamics generator is installed on the riser.

According to one embodiment of the invention, a plurality of magnetohydrodynamics generators are installed in the liquid metal circuit.

Other features and advantages of the present invention will become apparent from the following detailed description and the accompanying drawings, which illustrate, by way of example, the principles of the invention.

BRIEF DESCRIPTION OF THE DRAWINGS

By way of example only, preferred embodiments of the present invention are described hereinafter with reference to the accompanying drawings, wherein.

Other features and advantages of the present invention will become apparent from the following detailed description and the accompanying drawings, which illustrate, by way of example, the principles of the invention.

DETAILED DESCRIPTION OF THE INVENTION

It is to be understood that the disclosure is not limited in its application to the details of the embodiments as set forth in the following description. The invention is capable of other embodiments and of being practiced or of being carried out in various ways.

Furthermore, it is to be understood that the terminology used herein is for the purpose of description and should not be regarded as limiting. Contrary to the use of the term "consisting", the use of the terms "including", "containing", "comprising", or "having" and variations thereof is meant to encompass the items listed thereafter and equivalents thereof as well as additional items. The use of the term "a" or "an" is meant to encompass "one or more". Any numerical range recited herein is intended to include all values from the lower value to the upper value of that range.

From a thermodynamics perspective, lowering the vapor condensing temperature ($T_C$) can increase the overall power cycle efficiency.

For example, if the heat source temperature $T_H$ is 100° C. and the condensing temperature $T_C$ is −30° C., the cycle temperature difference would be 130° C. Between 100° C. and −30° C., with Genetron™ 245fa (R-245fa) as the working fluid, the ideal Rankine cycle $1_W$-$2_W$-$3_S$-$4_S$-$5_{RW}$-$6_W$-$1_W$ in FIG. 2 has an efficiency of 27.64% (vs. 15.87% between 100° C. and 30° C.) and the ideal Erisson cycle $1_W$-$2_W$-$3_S$-$4_S$-$5_{EW}$-$6_W$-$1_W$ has an efficiency of 32.25% (vs. 17.65% between 100° C. and 30° C.), thus power generation from the same heat source becomes more favorable.

Comparison of cycle efficiencies is summarized below in Table 1.

TABLE 1

| Comparison of cycle efficiencies | | | |
|---|---|---|---|
| | Carnot Efficiency (maximum theoretical) | Rankine Cycle Efficiency | Ericsson Cycle Efficiency |
| $T_H$ = 100° C.<br>$T_C$ = 30° C.<br>dT = 100° C. | 18.75% | 15.87% | 17.65% |
| $T_H$ = 100° C.<br>$T_C$ = −30° C.<br>dT = 130° C. | 34.84% | 27.64% | 32.25% |

Figure 4:
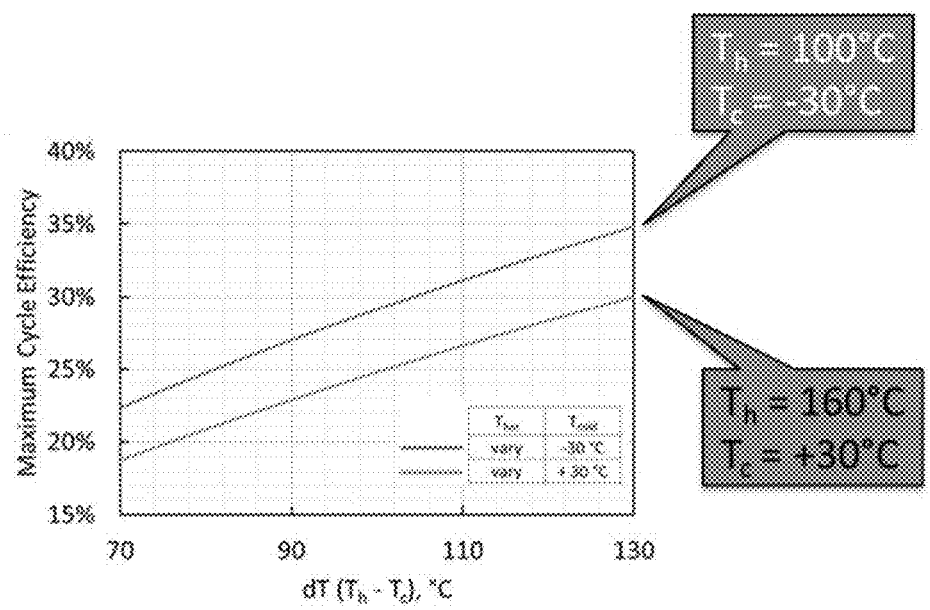
FIG. 4 is a graph showing theoretical cycle efficiencies based on Carnot's theorem.

Further, based on Carnot's theorem, reducing the temperature $T_C$ in a heat engine has a higher cycle efficiency than the option to increase the hot temperature $T_H$ for the same temperature difference ($T_H$−$T_C$), as shown in FIG. 4.

FIG. 4 shows theoretical cycle efficiency based on Carnot's theorem. Reducing the cold sink temperature in a heat engine has higher cycle efficiency than the option to increase the hot temperature for the same temperature difference ($T_H$−$T_C$).

Therefore, a technology that can take advantage of a changing temperature $T_C$ will have the potential to produce more power than the Organic Rankine Cycles and the prior arts of liquid metal magnetohydrodynamics systems which are currently designed to a fixed cold sink temperature.

The prior arts of the Organic Rankine Cycle and the liquid metal magnetohydrodynamics technology did not provide such a feature in their design which would allow the lowering of the vapor condensing temperature following a change in the ambient temperature.

Figure 1:
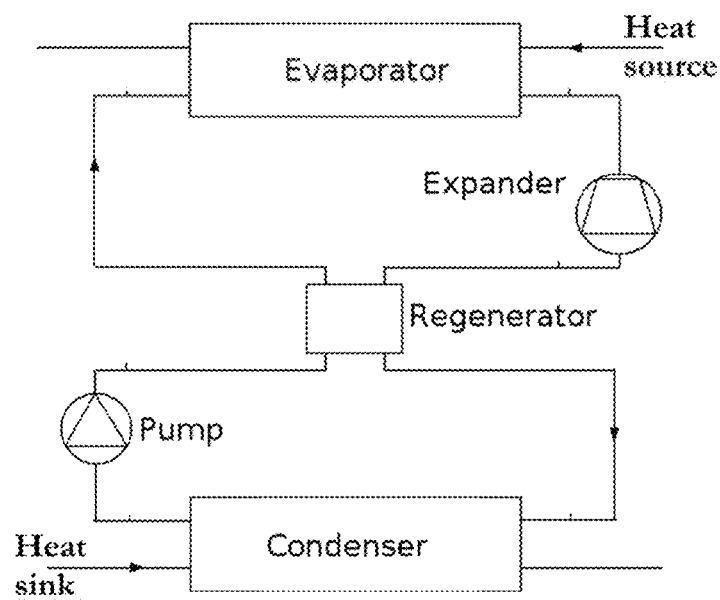
FIG. 1 is a diagram of a known typical configuration of an Organic Rankine Cycle system.
Figure 2:
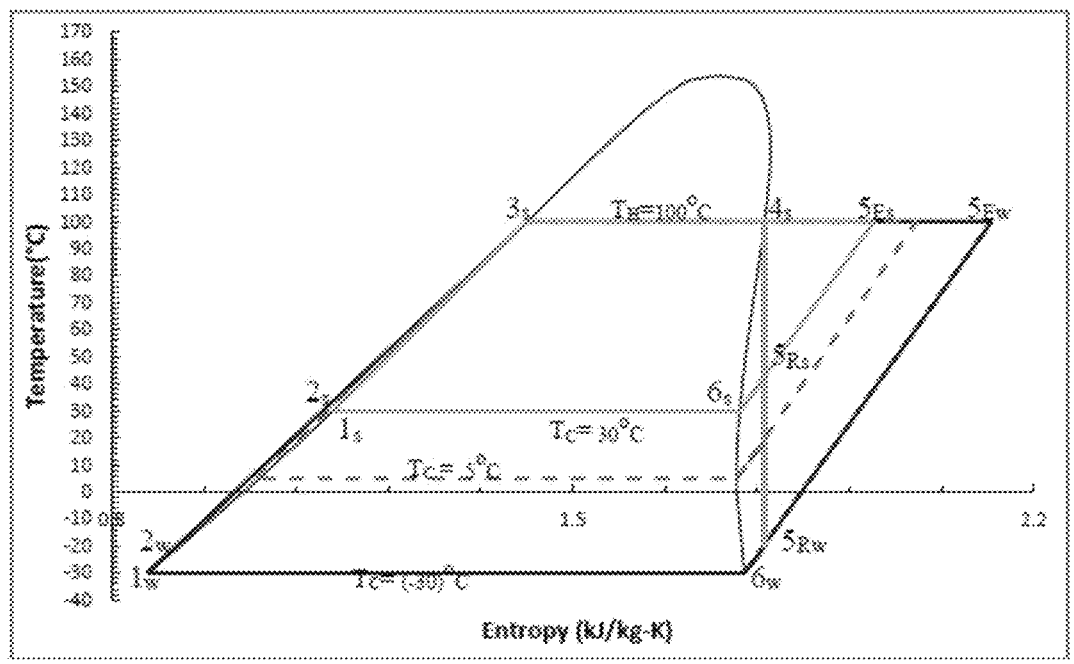
FIG. 2 is a graph of a typical Organic Rankine Cycle $1_S\text{-}2_S\text{-}3_S\text{-}4_S\text{-}5_{RS}\text{-}6_S\text{-}1_S$: based on heat sink at high end summer temperature; Organic Rankine Cycle $1_W\text{-}2_W\text{-}3_S\text{-}4_S\text{-}5_{RW}\text{-}6_W\text{-}1_W$: based on heat sink at low end winter temperature; Ericsson cycle $1_S\text{-}2_S\text{-}3_S\text{-}4_S\text{-}5_{ES}\text{-}6_S\text{-}1_S$: based on heat sink at high end summer temperature; Ericsson cycle $1_W\text{-}2_W\text{-}3_S\text{-}4_S\text{-}5_{EW}\text{-}6_W\text{-}1_W$: based on heat sink at low end winter temperature.
Figure 3:
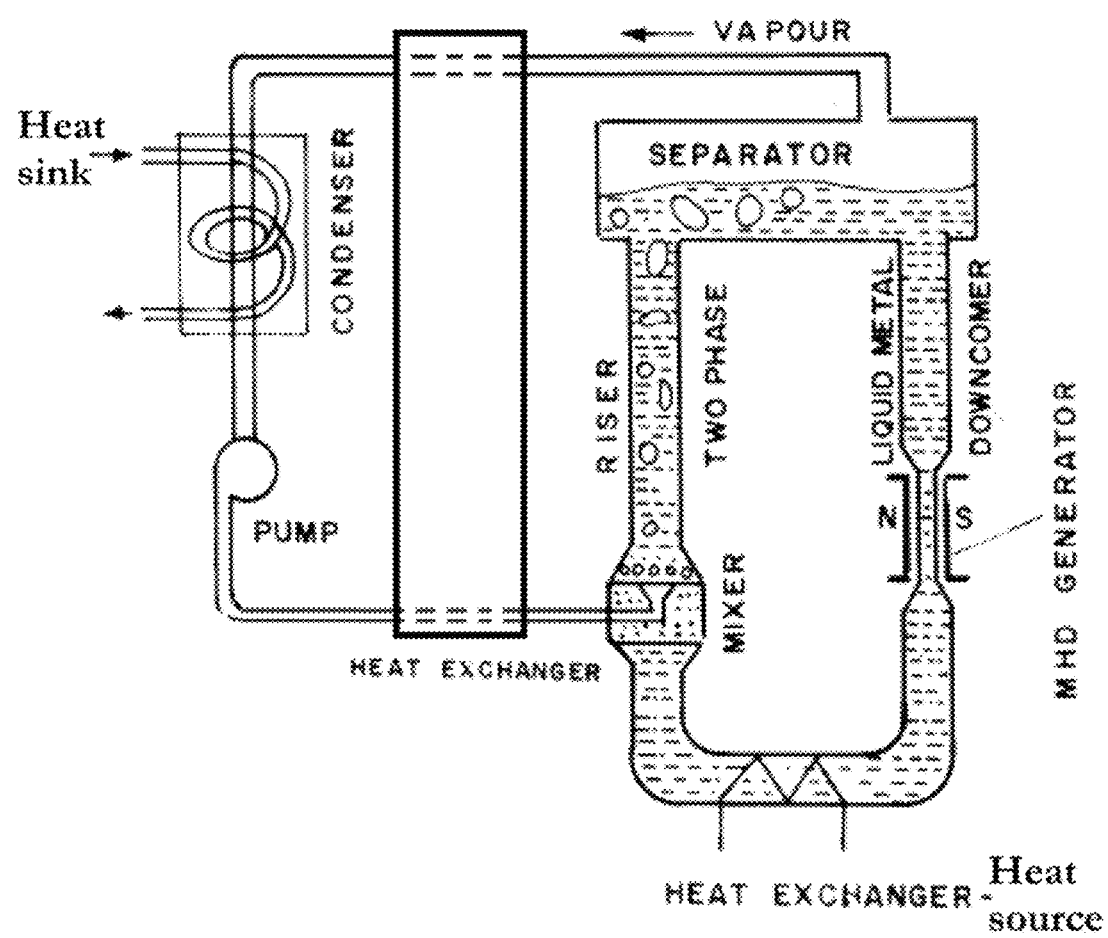
FIG. 3 is a diagram of the configuration of a known liquid metal magnetohydrodynamics system.

According to the present invention, the low temperature magnetohydrodynamics system as disclosed herein provides a means to take advantage of the full ambient temperature range and allows $T_C$ to change, for instance, in a range between 30° C. and −30° C. as shown in FIG. 2. Therefore, such low temperature magnetohydrodynamics system is more effective in its conversion of heat to power.

The low temperature magnetohydrodynamics technology leverages the high efficiency of the Ericsson cycle of liquid metal magnetohydrodynamics systems in order to provide a means to produce electricity from low temperature sources.

The low temperature magnetohydrodynamics technology has specific advantages over competing technologies for applications in cold climate, such as in the Canadian climate.

The low temperature magnetohydrodynamics systems disclosed herein provide, inter alia, improved efficiency in the following aspects:
1) The system design and configuration enable better use of lower temperature sinks;
2) The use of new liquid metal such as Galinstan™;
3) The use of new refrigerant and/or working fluids;
4) The use of new lift pumps to improve circulation of metal through computational fluid dynamics and experiment;
5) The use of new rare earth permanent magnets in paired Halbach arrays and series connection of electrodes.
6) The use of new natural circulation to diminish or eliminate pump power consumption;
7) The integration of a separator and a recuperator;
8) The integration of a mixer and a recuperator; and
9) The use of a two-phase magnetohydrodynamics generator on a riser.

System Configuration with Better Use of Lower Temperature Sinks:

According to one aspect of the present invention, a two-pronged approach has been employed to maximize the energy recovery from the heat source:
1. A double loop system that includes both a refrigerant loop and a liquid metal loop; and
2. A configuration that takes advantage of cold heat sinks to optimize power output.

Figure 5:
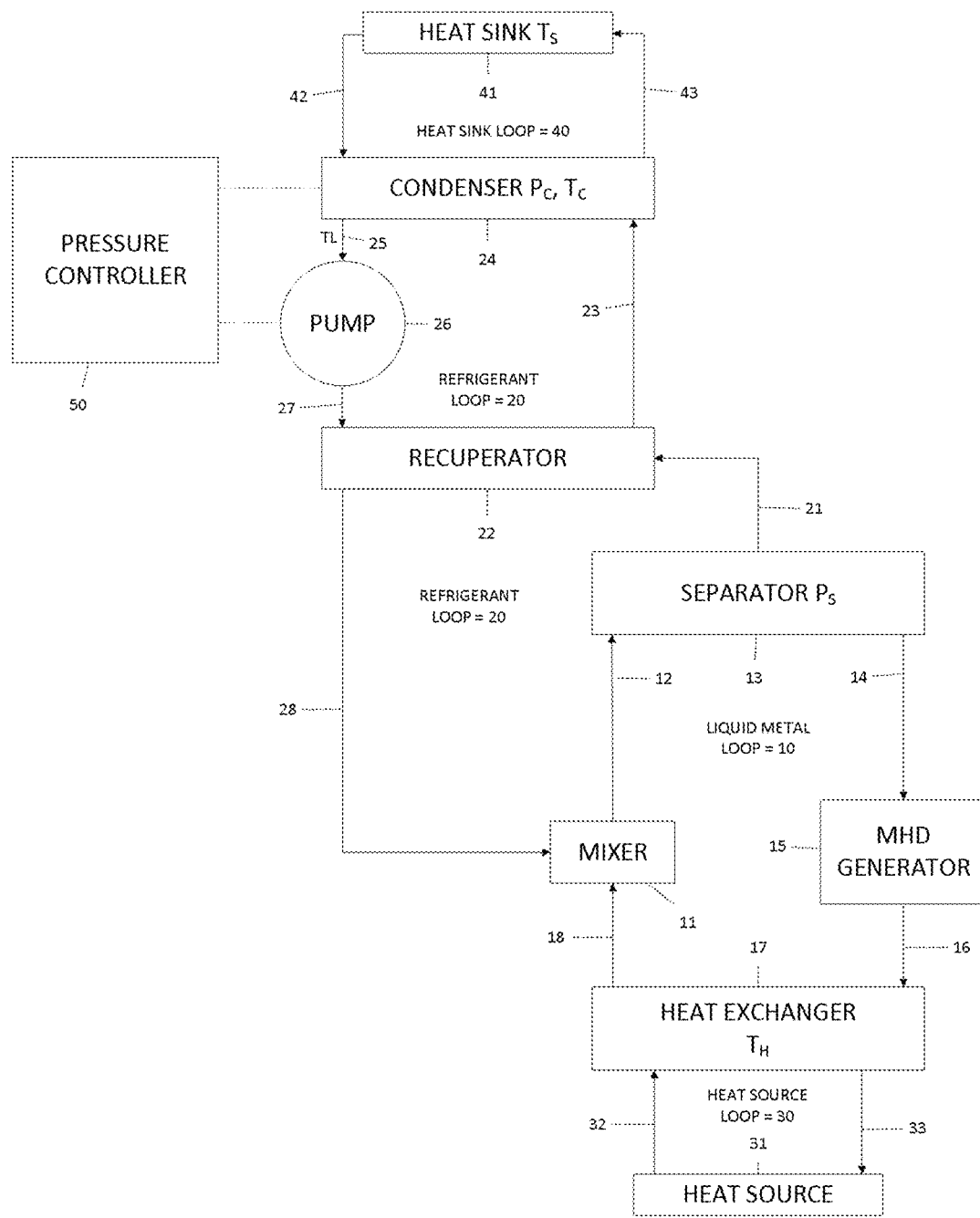
FIG. 5 is a diagram of the configuration of an embodiment of a low temperature magnetohydrodynamics system according to the present invention.

FIG. 5 illustrates the configuration of an embodiment of a low temperature magnetohydrodynamics power system according to the present invention.

This configuration can effectively transfer heat to a moving liquid metal that is also propelled with the assistance of a refrigerant. The metal passes through a magnetic field and produces its own electric potential that is drawn out to produce electricity.

FIG. 5 illustrates a configuration of the low temperature magnetohydrodynamics system that converts low temperature heat to power. The system comprises a closed-looped liquid metal circuit for containing and circulating a liquid metal (or liquid metal loop) 10 (comprising piping and components 11-12-13-14-15-16-17-18), a closed-looped refrigerant circuit for containing and circulating a refrigerant (or refrigerant loop) 20 (comprising piping and components 11-12-13-21-22-23-24-25-26-27-22-28), a closed-looped heat source circuit (or heat source loop) 30 (comprising piping and components 17-33-31-32) and a closed-looped heat sink circuit (or heat sink loop) 40 (comprising piping and components 24-43-41-42) with a pressure controller 50. Both the liquid metal loop 10 and the refrigerant loop 20 are vertically positioned.

Referring to FIG. 5, a liquid metal fills the liquid metal loop 10, and a refrigerant is used to fill the refrigerant loop 20. Fluids from both loops meet in a mixer 11 to form a two-phase mixture as the refrigerant is in vapor or gas state. This mixture flows up together, in a gas-liquid metal two-phase mode, along a riser 12/18 into a separator 13, where the refrigerant vapor and liquid metal are separated.

The refrigerant vapor, after being separated from the liquid metal, is cooled down first by a recuperator 22, then by a condenser 24 by passing through a coolant from heat sink 41 and giving off heat. The refrigerant changes from vapor to liquid in a condenser 24. The heat sink usually is the ambient surrounding. The condenser 24 may be connected to a natural coolant such as air or water. After the condenser 24, a liquid pump 26 drives the flow of the liquid refrigerant in the refrigerant loop 20. The liquid refrigerant first is pre-heated in recuperator 22, then meets again with hot liquid metal in the mixer 11 to change phase from liquid to vapor, and the cycle continues.

After separation, the single-phase liquid metal flows down a downcomer 14/16.

Since the two-phase mixture of liquid metal and refrigerant vapor in the riser 12/18 is lighter than that of the pure liquid metal in the downcomer 14/16, natural circulation in the liquid metal loop 10 is generated. A stationary magnetohydrodynamic generator (MHD generator) 15 is placed in the liquid metal loop 10 on the downcomer 14/16 to convert the kinetic energy of the moving liquid metal into electricity. Heat source 31 transfers heat to the liquid metal loop 10 via a heat exchanger 17 and helps driving the circulation of both the liquid metal loop 10 and the heat source loop 30. The heat source 31 may be a low-temperature heat source. Since liquid metal has a high thermal conductivity, the heat exchanger could effectively withdraw heat from the low-temperature heat source. Then the heated liquid metal enters the mixer 11 to heat the refrigerant.

The pressure controller 50 is used to control speed of the pump 26 for the refrigerant in order to adjust the pressure in the condenser 24 ($P_C$) following the changing ambient temperature ($T_S$) of the heat sink 41 to vary the condensing temperature ($T_C$).

According to an embodiment of the present invention, ambient air or ambient water is used as the heat sink.

According to an embodiment of the present invention, temperature of the ambient air is between −50° C. and 50° C.

For instance, when ambient air is used as heat sink with an ambient temperature ($T_S$) at −35° C. in the winter time, the condensing temperature ($T_{C-30}$) could reach −30° C. at a corresponding condensing pressure ($P_{C-30}$). The condensing pressure ($P_{C-30}$) plus the pressure drop through recuperator 22 and pipes 21 & 23 will be the pressure ($P_{S-30}$) in the separator 13.

When the ambient temperature ($T_S$) goes up, for instance, at 25° C. in the summer time, the cooling capacity of the heat sink will decrease, so does the rate of condensation, which will result in a higher condensing pressure ($P_{C+30}$) at a corresponding condensing temperature reaching 30° C. ($T_{C+30}$). Then the pressure in the separator 13 will go up to ($P_{S+30}$).

At the same time, in order to keep the liquid level in the condenser 24, the pump 26 will decrease flow in the summer time following the rise of ambient temperature ($T_S$) since the rate of condensation will decrease. In contrast, in order to keep the liquid level in the condenser 24, the pump 26 will increase flow in the winter time following the drop of ambient temperature ($T_S$) since the rate of condensation will be increasing.

The pressure controller 50 allows the low temperature magnetohydrodynamics system described above to operate in a mode of adjustable condensing pressure ($P_C$) and corresponding temperature ($T_C$) following the change of ambient temperature ($T_S$).

The benefits of employing an adjustable condensing temperature ($T_C$) are, inter alia:

The heat sink temperature $T_S$ is maintained by naturally existing coolants such as a body of water or surrounding air. In Canada, ambient air temperatures vary across both a daily and seasonal range. Daily temperature swings of more than 15° C. are common, and below-zero temperatures (sometimes as low as −35° C.) are seasonally common from late fall through early spring. In order to take advantage of this below-zero ambient coolant, a refrigerant is deliberately used in the refrigerant loop 20 to allow condensing temperature ($T_C$) to drop below zero so the system efficiency can be increased.

According to thermodynamic principles, the efficiency of the Ericsson cycle power system increases when the temperature difference ($T_H-T_C$) increases (see FIG. 4) due to the drop of heat sink temperature $T_S$. Uniquely, the low temperature magnetohydrodynamics system configuration disclosed herein, which is based on the Ericsson cycle, introduces a way to boost the cycle efficiency by allowing it to work in a greater range of temperature difference conditions when the heat sink temperature $T_S$ changes over a great range.

Prior arts of low temperature magnetohydrodynamics systems employ a fixed condensing temperature ($T_C$) usually based on heat sink or ambient temperature $T_S$ in the summer time. In contrast, the low temperature magnetohydrodynamics system disclosed herein greatly overcomes a below-zero heat sink limitation imposed on these existing systems.

Use of New Liquid Metal (Galinstan™):

According to one aspect of the present invention, use of an alloy comprising gallium, indium, and tin as the liquid metal is disclosed, and more particularly, Galinstan™, as this is commercially available.

Galinstan™ (GaInSn) is a non-toxic liquid metal, a eutectic alloy of gallium (Ga), indium (In), and tin (Sn). The composition of GaInSn was patented in 2000 and its melting temperature was claimed to be about −19.5° C. under normal pressure and atmospheric conditions, and its vaporization point was reported to be above 1800° C. With a reported melting temperature above 0° C., many GaInSn alloys retain their liquid state at room temperature. GaInSn has a very low vapor pressure and will not emit respirable metal vapor at room conditions, which generally makes GaInSn safe to use.

GaInSn is most used as a replacement for toxic mercury, which has been used in thermometers. Compared to mercury, Galinstan™ exhibits a lower density (6360 kg/m³) that is about half of that of mercury which will result in reduced velocity of the buoyancy-driven flow in circulation—a disadvantage given the magnetohydrodynamics power output is inversely proportional to the square of flow velocity.

However, Galinstan™ exhibits a higher conductivity at $\sigma=3.7\times10^6$ S/m, an advantage given that the power output of an magnetohydrodynamics generator is directly proportional to its fluid's conductivity. Overall, Galinstan™ would have a performance equivalent to mercury but with no similar safety concerns as that of mercury.

Use of New Refrigerant/Working Fluids:

According to one aspect of the present invention, hydrocarbon refrigerants, which are low global warming alternatives that can replace the ozone-depleting refrigerants, are used. This is in contrast to the existing liquid metal magnetohydrodynamics systems, where the refrigerants used were Freon™ based, for example, Genetron™ 113, which causes ozone layer depletion.

Use of Gas-Lift Pumps to Improve Circulation of Metal Through Computational Fluid Dynamics and Experiments at the Location of Mixer (FIGS. 5 and 7 to 10) when the Thermodynamic Fluid is a Vapor or Gas:

According to a further aspect of the present invention, there is provided the use of gas-lift pumps to improve circulation of metal through computational fluid dynamics and experiments.

Through computational fluid dynamics modeling study and experiments conducted on a two-phase flow of a gas-liquid metal mixture, a more efficient means for pumping gas-liquid metal two-phase flow has been identified.

The gas injection positions were configured in three modes in the riser with the gas-lift pump:
1) central/axial,
2) annular/axial, and
3) annular/radial.

The annular/axial mode was found to be more efficient. The annular/axial mode can circulate the liquid metal at a higher velocity through the MHD generator, thereby increasing the power output and ultimately optimizing the performance of the low temperature magnetohydrodynamics system.

Use of New Rare Earth Permanent Magnets in Paired Halbach Arrays:

According to a further aspect of the present invention, new rare earth permanent magnets in paired Halbach arrays are used in the magnetohydrodynamics generator.

A drawback of the low temperature magnetohydrodynamics systems is that they generally use electromagnets that consume electrical power in MHD generator. Some prior art systems have proposed using permanent magnets in the MHD generator to eliminate the power consumption but encountered the limitation of getting sufficiently high magnetic flux density in permanent magnets. New rare earth permanent magnets are the strongest type of permanent magnet available commercially. Using rare earth permanent magnets in paired Halbach arrays can augment the magnetic field.

Figure 6:
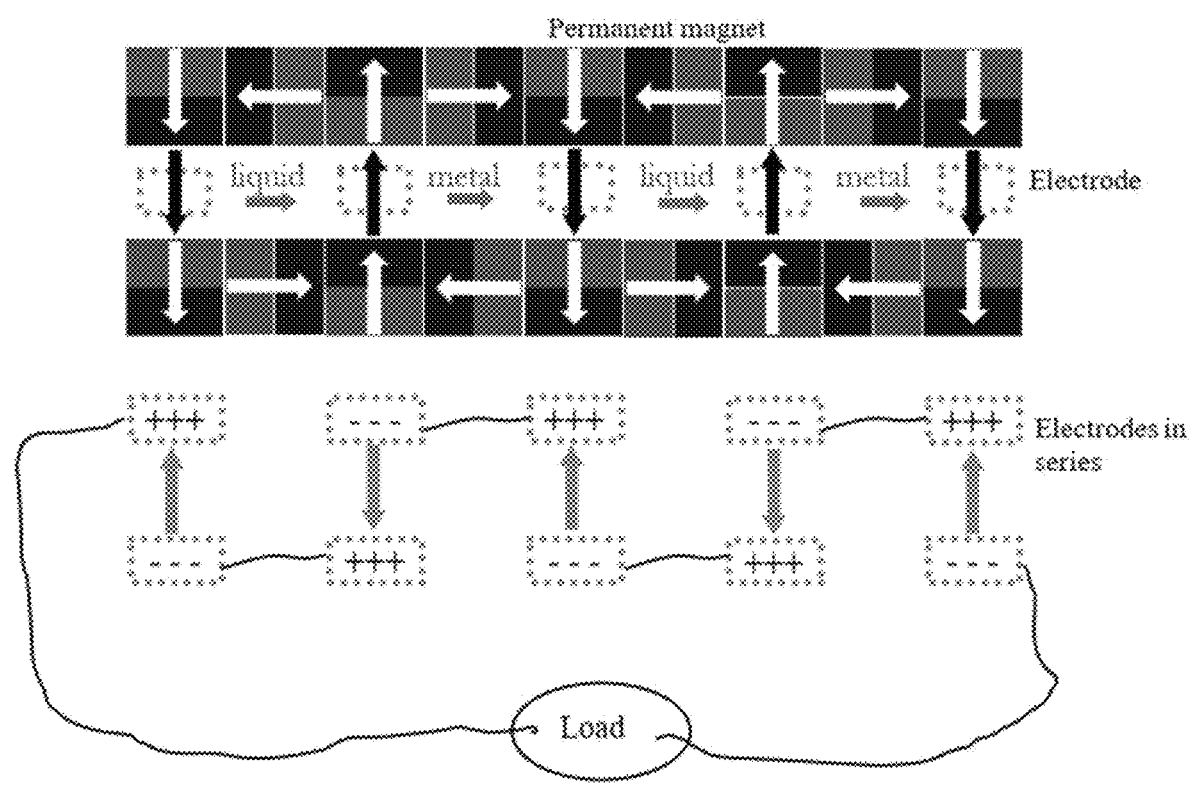
FIG. 6 shows a configuration of permanent magnets in paired Halbach arrays and a series electrode connection for an embodiment of a low temperature magnetohydrodynamics system according to the present invention.

FIG. 6 shows a novel configuration of permanent magnets in paired Halbach arrays and a series electrode connection for a low temperature magnetohydrodynamics system according to the present invention.

A Halbach array is a special arrangement of permanent magnets that augments the magnetic field on one side of the array while cancelling the field to near zero on the other side. A paired Halbach arrays will make magnet field polarity switch from section to section, confine and concentrate magnetic flux between the paired Halbach arrays, thus largely augment the magnetic field. The polarity switch of magnet field from section to section also allows a series connection of two adjacent electrodes to achieve an overall high voltage output of the MHD generator. Meanwhile, the Lorentz force exerted on electrons in conductive liquid metal will prevent current flow between two adjacent electrodes where exists electrical potential, thus preventing the shortage of adjacent electrodes.

A series connection of electrodes to achieve an overall high voltage output of MHD generator is also possible for using a normal single-polarity magnet field.

Figure 7:
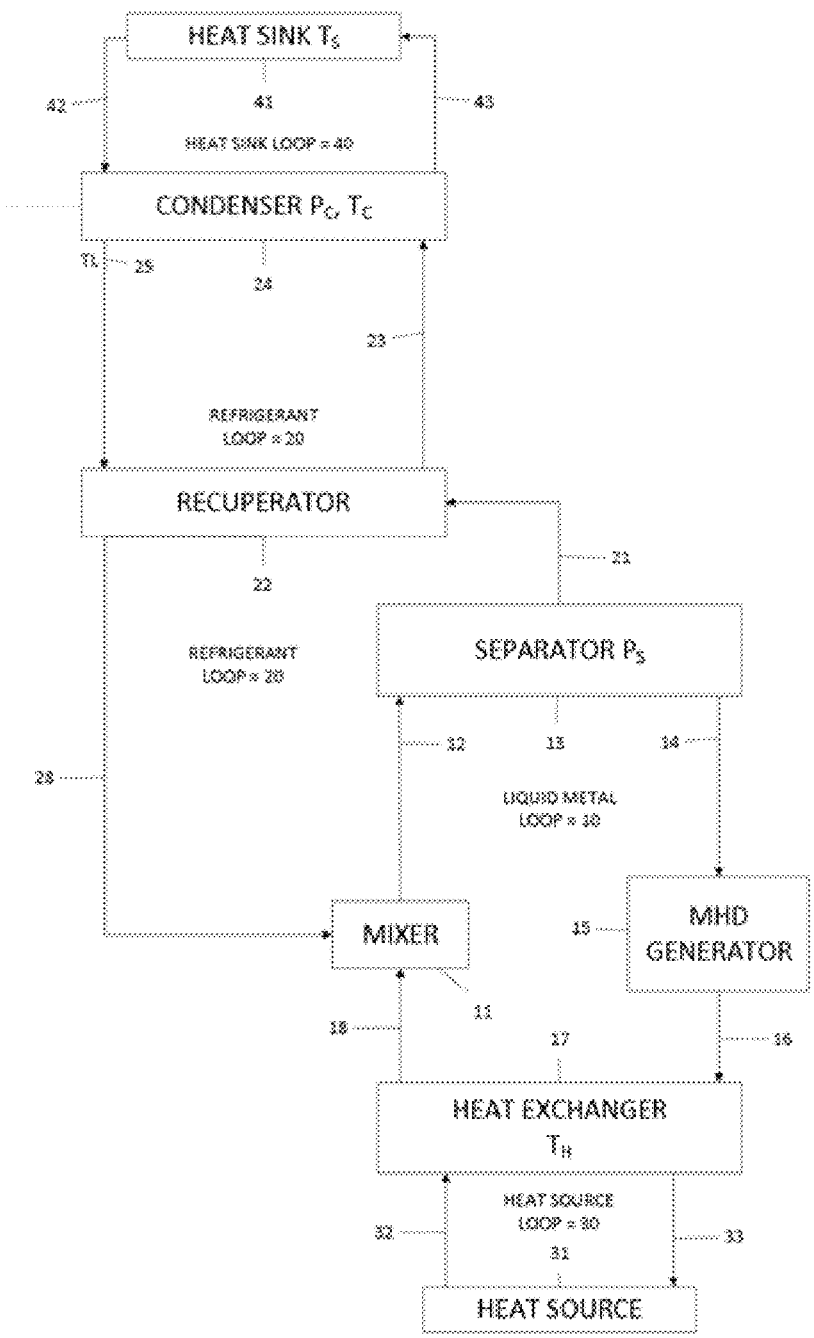
FIG. 7 is a diagram of the configuration of an embodiment of a low temperature magnetohydrodynamics system according to the present invention, without the use of a pump.

Configuration Using Natural Circulation without a Pump to Diminish or Eliminate Power Consumption:

FIG. 7 is a diagram of the configuration of the low temperature magnetohydrodynamics system according to the present invention, without the use of a pump.

Because of the vertical position of the configuration, the condenser 24 may be installed at a high elevation and the head in lines 25, 27, and 28 in FIG. 5 could compensate the inlet pressure of the pump 26 thus reducing the pump power consumption, thereby reducing the energy loss of the entire system.

This configuration would improve the performance of the low temperature magnetohydrodynamics system. One option is to place the condenser at an elevation sufficiently high to eliminate the pump 26 and its power consumption, as shown in FIG. 7.

Figure 8:
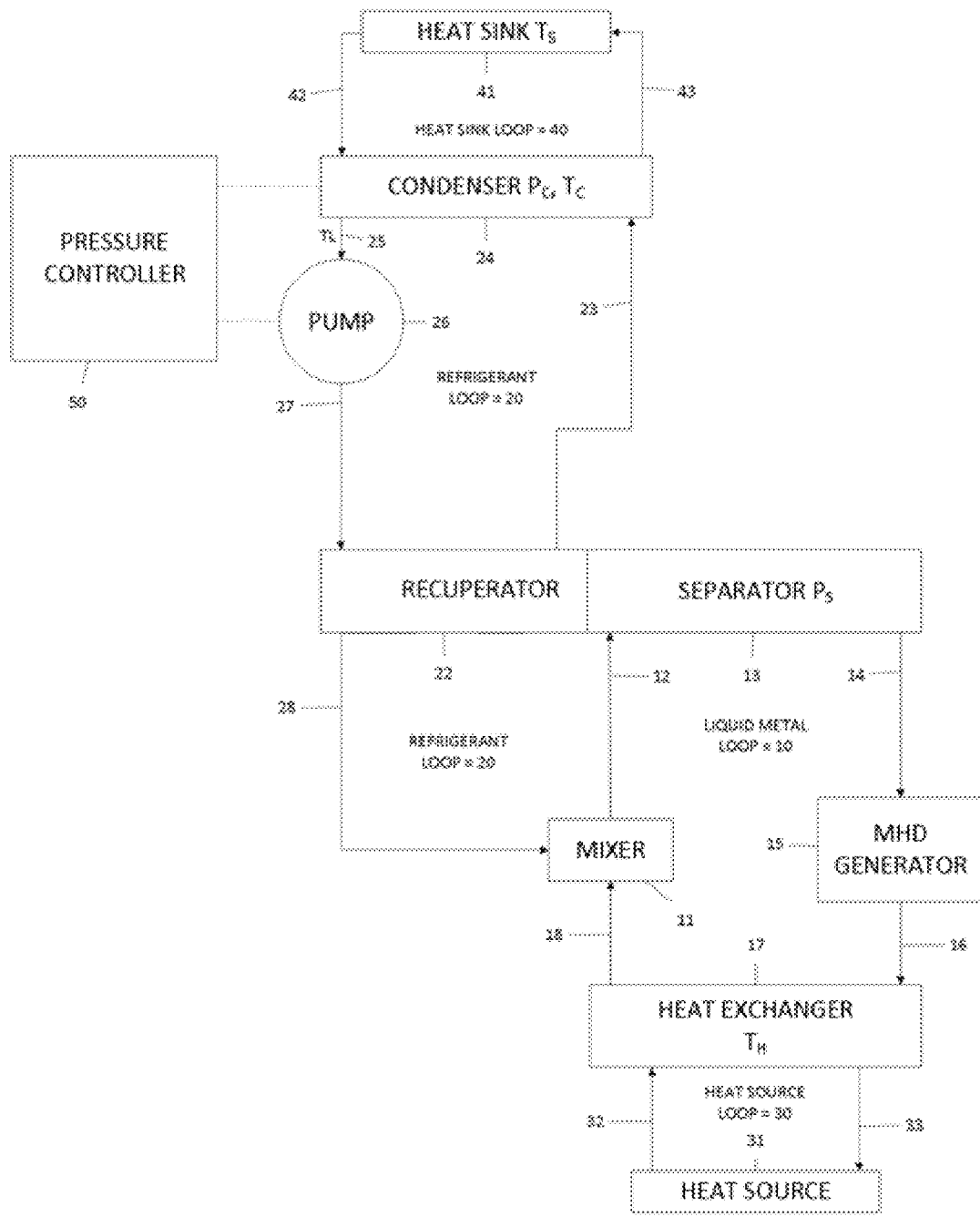
FIG. 8 is a diagram of the configuration of an embodiment of a low temperature magnetohydrodynamics system according to the present invention, with integrated recuperator and separator.

Configuration Using Integration of the Separator and the Recuperator:

FIG. 8 is a diagram of the configuration of the low temperature magnetohydrodynamics system according to the present invention, with integrated recuperator and separator.

As shown in FIG. 8, integration of the separator and the recuperator makes the system design compact.

Also, the vapor out of the separator 13 is cooled down in the recuperator 22 to a temperature close to the ambient temperature so that the heat loss through pipe 21 in FIG. 5 is eliminated.

Figure 9:
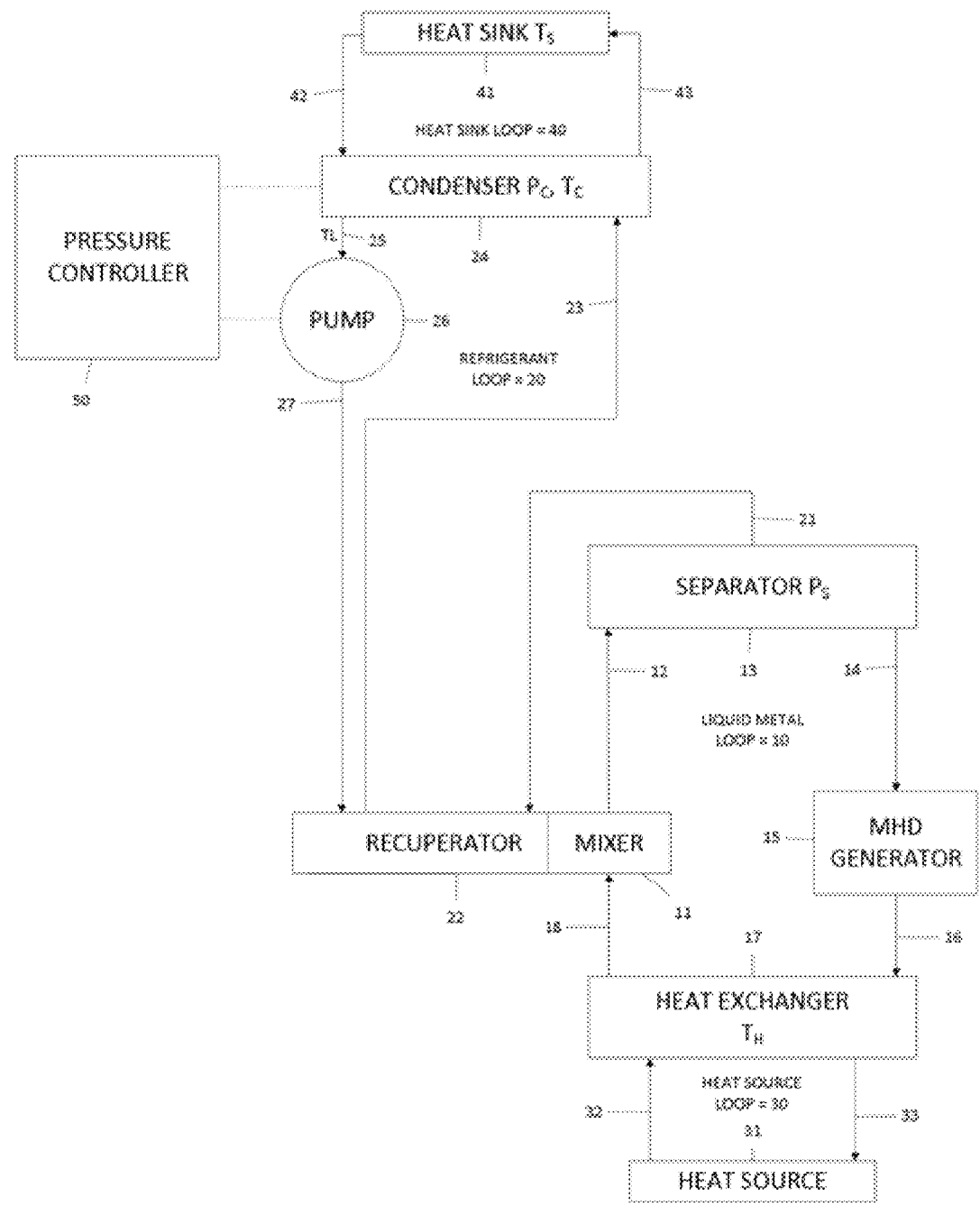
FIG. 9 is a diagram of the configuration of an embodiment of a low temperature magnetohydrodynamics system according to the present invention, with integrated recuperator and mixer.

Configuration Using Integration of the Recuperator and the Mixer:

FIG. 9 is a diagram of the configuration of the low temperature magnetohydrodynamics system according to the present invention, with integrated recuperator and mixer.

As shown in FIG. 9, integration of the recuperator 22 and the mixer 11 makes the system design compact.

Figure 10:
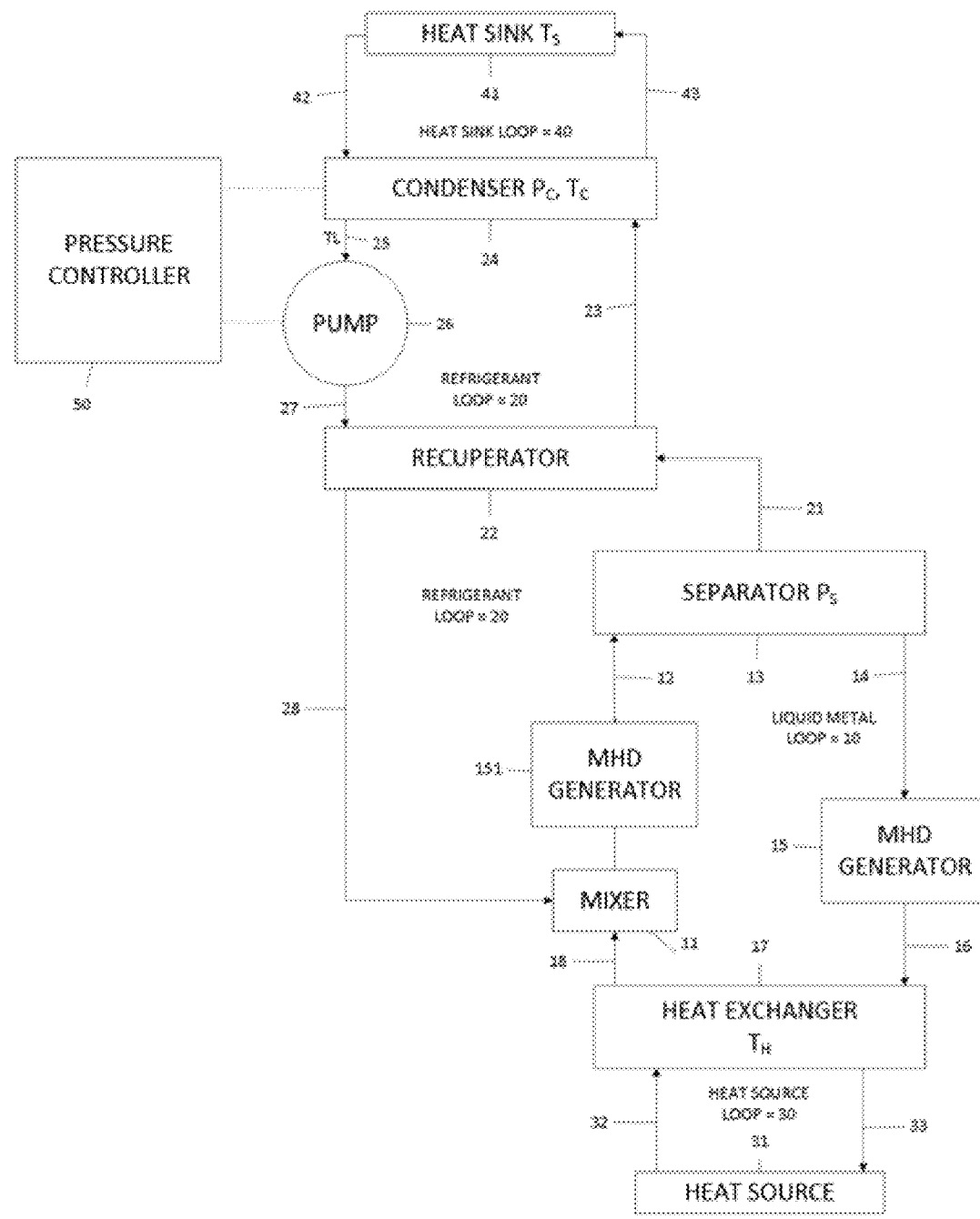
FIG. 10 is a diagram of the configuration of the low temperature magnetohydrodynamics system according to the present invention, with the MHD generators having a dual location.

Configuration Using Two-Phase Magnetohydrodynamics Generator on the Riser:

FIG. 10 is a diagram of a configuration of the low temperature magnetohydrodynamics system according to the present invention, where MHD generators have a dual location (riser 12/18 and downcomer 14/16).

There is also the option to install the magnetohydrodynamics generator in the riser as opposed to the downcomer.

Although the present invention has been described in considerable detail with reference to certain preferred embodiments thereof, other embodiments and modifications are possible. Therefore, the scope of the appended claims should not be limited by the preferred embodiments set forth in the examples but should be given the broadest interpretation consistent with the description as a whole.

The invention claimed is:

1. A system for converting a low-temperature heat source into power, comprising:
   a vertically positioned closed-looped liquid metal circuit for containing and circulating a liquid metal,
   a vertically positioned closed-looped refrigerant circuit for containing and circulating a refrigerant,
   the liquid metal circuit and the refrigerant circuit interacting with each other through a mixer, a riser and a separator shared by the liquid metal circuit and the refrigerant circuit,
   a closed-looped heat sink circuit interacting with the refrigerant circuit through a condenser shared by the heat sink circuit and the refrigerant circuit,
   a closed-looped heat source circuit interacting with the liquid metal circuit through a heat exchanger shared by the heat source circuit and the liquid metal circuit, and
   a pressure controller,
   wherein:
   heat is transferred from the low-temperature heat source to the liquid metal circulating in the liquid metal circuit through the heat exchanger to provide a heated liquid metal,
   the refrigerant circulating in the refrigerant circuit is heated into vapor form by the heated liquid metal that enters the mixer, the liquid metal and the refrigerant in vapor form producing a two-phase mixture,
   the two-phase mixture is flown up the riser and into the separator to be separated,
   wherein:
   the refrigerant in vapor form, after being separated from the liquid metal in the separator, is entered through:
      a recuperator, wherein heat is released from the refrigerant in vapor form to liquid refrigerant,
      the condenser, wherein the refrigerant is further cooled down by passing through a coolant from a heat sink to release heat to the heat sink and change the refrigerant in vapor form into the liquid refrigerant,
      a liquid pump, the liquid pump driving flow of the liquid refrigerant,
      the recuperator, wherein the liquid refrigerant is pre-heated by the refrigerant in vapor form, and
      the mixer, wherein the liquid refrigerant upon mixing with the heated liquid metal entering the mixer changes from the liquid refrigerant into the refrigerant in vapor form, and
   wherein:
   the liquid metal, after being separated from the refrigerant in the separator, is entered through:
      a magnetohydrodynamic generator through a downcomer, wherein kinetic energy of the liquid metal is converted into electricity by the magnetohydrodynamic generator,
      the heat exchanger, wherein the heat is transferred from the low-temperature heat source to the liquid metal circulating the liquid metal circuit to provide the heated liquid metal, and
   wherein speed of the liquid pump is controlled by the pressure controller and flowrate of the liquid refrigerant according to an adjustable pressure in the condenser following a changing temperature of the heat sink to vary condensing temperature in the condenser.

2. The system according to claim 1, wherein the low-temperature heat source is the heat source with a temperature below 150° C.

3. The system according to claim 1, wherein ambient air or ambient water is used as the heat sink.

4. The system according to claim 1, wherein the temperature of the heat sink is between −50° C. and 50° C.

5. The system according to claim 4, wherein the temperature of the heat sink is between −35° C. and 25° C.

6. The system according to claim 1, wherein the liquid metal is an alloy comprising gallium, indium, and tin.

7. The system according to claim 6, wherein the alloy is of 68.5% Ga, 21.5% In, and 10.0% Sn (by weight).

8. The system according to claim 1, wherein the refrigerant is at least one of hydrocarbon refrigerants.

9. The system according to claim 1, further comprising a gas-lift pump at the location of the mixer, wherein the gas-lift pump operates when a thermodynamic fluid entering the mixer is in the form of vapor or gas, to improve circulation of the liquid metal through gas injection, and wherein the position of the gas injection is configured in the riser such that the gas injection is in a central/axial, annular/axial, or annular/radial mode.

10. The system according to claim 1, wherein rare earth permanent magnets in paired Halbach arrays are used in the magnetohydrodynamics generator to augment the magnetic field, and a series electrode connection is made possible to achieve a high voltage output.

11. The system according to claim 1, wherein the recuperator and the separator are integrated.

12. The system according to claim 1, wherein the recuperator and the mixer are integrated.

13. The system according to claim 1, wherein an additional magnetohydrodynamics generator is installed on the riser.

14. The system according to claim 1, wherein a plurality of magnetohydrodynamics generators is installed in the liquid metal circuit.

* * * * *